(12) United States Patent
Oike et al.

(10) Patent No.: US 11,351,712 B2
(45) Date of Patent: Jun. 7, 2022

(54) BLOW-MOLDING METHOD AND BLOW-MOLDING APPARATUS

(71) Applicant: NISSEI ASB MACHINE CO., LTD., Nagano (JP)

(72) Inventors: Toshiteru Oike, Nagano (JP); Daizaburo Takehana, Nagano (JP); Yasuo Ozaki, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 16/651,089

(22) PCT Filed: Sep. 28, 2018

(86) PCT No.: PCT/JP2018/036318
§ 371 (c)(1),
(2) Date: Mar. 26, 2020

(87) PCT Pub. No.: WO2019/065993
PCT Pub. Date: Apr. 4, 2019

(65) Prior Publication Data
US 2020/0230861 A1    Jul. 23, 2020

(30) Foreign Application Priority Data

Sep. 29, 2017 (JP) .............................. JP2017-190850
Oct. 27, 2017 (JP) .............................. JP2017-208543

(51) Int. Cl.
*B29C 49/18* (2006.01)
*B29C 49/12* (2006.01)
(Continued)

(52) U.S. Cl.
CPC .............. *B29C 49/18* (2013.01); *B29C 49/12* (2013.01); *B29K 2067/003* (2013.01); *B29L 2031/7158* (2013.01)

(58) Field of Classification Search
CPC ... B29C 49/18; B29C 49/12; B29K 2067/003; B29L 2031/158
See application file for complete search history.

(56) References Cited

U.S. PATENT DOCUMENTS 5,474,735 A * 12/1995 Krishnakumar ........ B29C 49/16
264/529
5,681,520 A * 10/1997 Koda ...................... B29C 49/16
425/530
(Continued)

FOREIGN PATENT DOCUMENTS

JP         59-2820      1/1984
JP      2003-103610    4/2003
(Continued)

OTHER PUBLICATIONS

Official Communication (ISA/210) issued in International Patent Application No. PCT/JP2018/036318, dated Oct. 30, 2018, and English translation thereof.
(Continued)

*Primary Examiner* — Matthew J Daniels
*Assistant Examiner* — Shibin Liang
(74) *Attorney, Agent, or Firm* — Greenblum & Bernstein, P.L.C.

(57) ABSTRACT

A blow molding method includes: performing a primary blowing on a resin preform to form an intermediate molded product; and performing a final blowing on the intermediate molded product to form a final molded product, and at least one step of performing the primary blowing and the final blowing includes a thinning step of continuously repeatedly performing, within a predetermined time, steps of: stretching an object by blowing; and contracting stretched parts of the object by exhausting blown air.

6 Claims, 10 Drawing Sheets

(51) Int. Cl.
 *B29K 67/00* (2006.01)
 *B29L 31/00* (2006.01)

(56) References Cited

U.S. PATENT DOCUMENTS

| | | |
|---|---|---|
| 6,080,353 A | 6/2000 | Tsuchiya |
| 2011/0024380 A1 | 2/2011 | Moretti |
| 2011/0076432 A1 | 3/2011 | Sakaguchi et al. |
| 2012/0132608 A1 | 5/2012 | Aoki et al. |
| 2014/0190924 A1 | 7/2014 | Aoki et al. |
| 2015/0290865 A1 | 10/2015 | Horigome et al. |
| 2019/0022914 A1 | 1/2019 | Horigome et al. |

FOREIGN PATENT DOCUMENTS

| | | |
|---|---|---|
| JP | 3760045 | 3/2006 |
| JP | 3907494 | 4/2007 |
| JP | 2008-110768 | 5/2008 |
| JP | 2011-37139 | 2/2011 |
| JP | 2013-107391 | 6/2013 |
| JP | 2018-62088 | 4/2018 |

OTHER PUBLICATIONS

Official Communication (ISA/237) issued in International Patent Application No. PCT/JP2018/036318, dated Oct. 30, 2018, along with an English translation thereof.
Extended European Search Report issued in European Patent Application No. 18861663.5 dated May 6, 2021.

\* cited by examiner

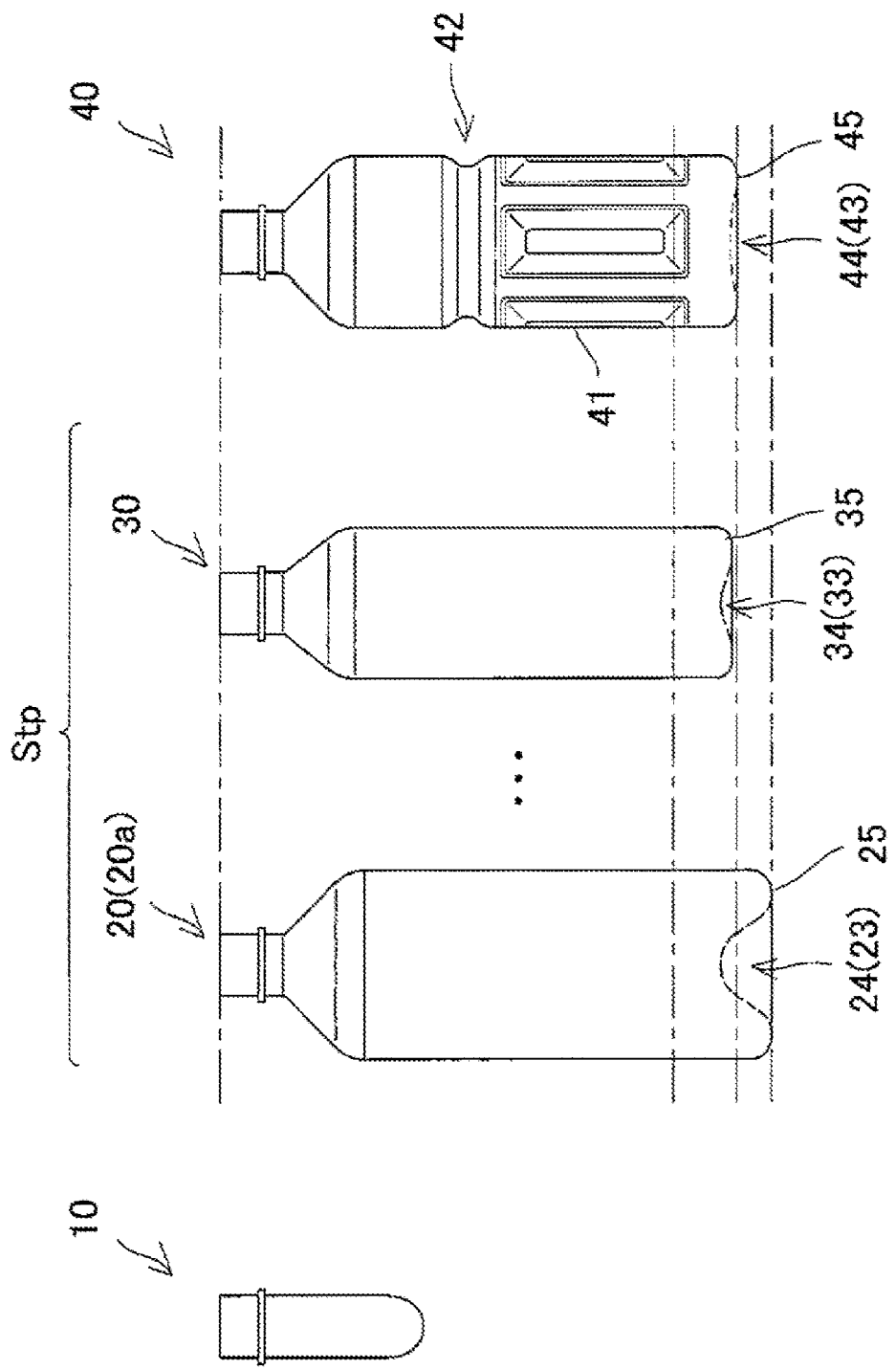

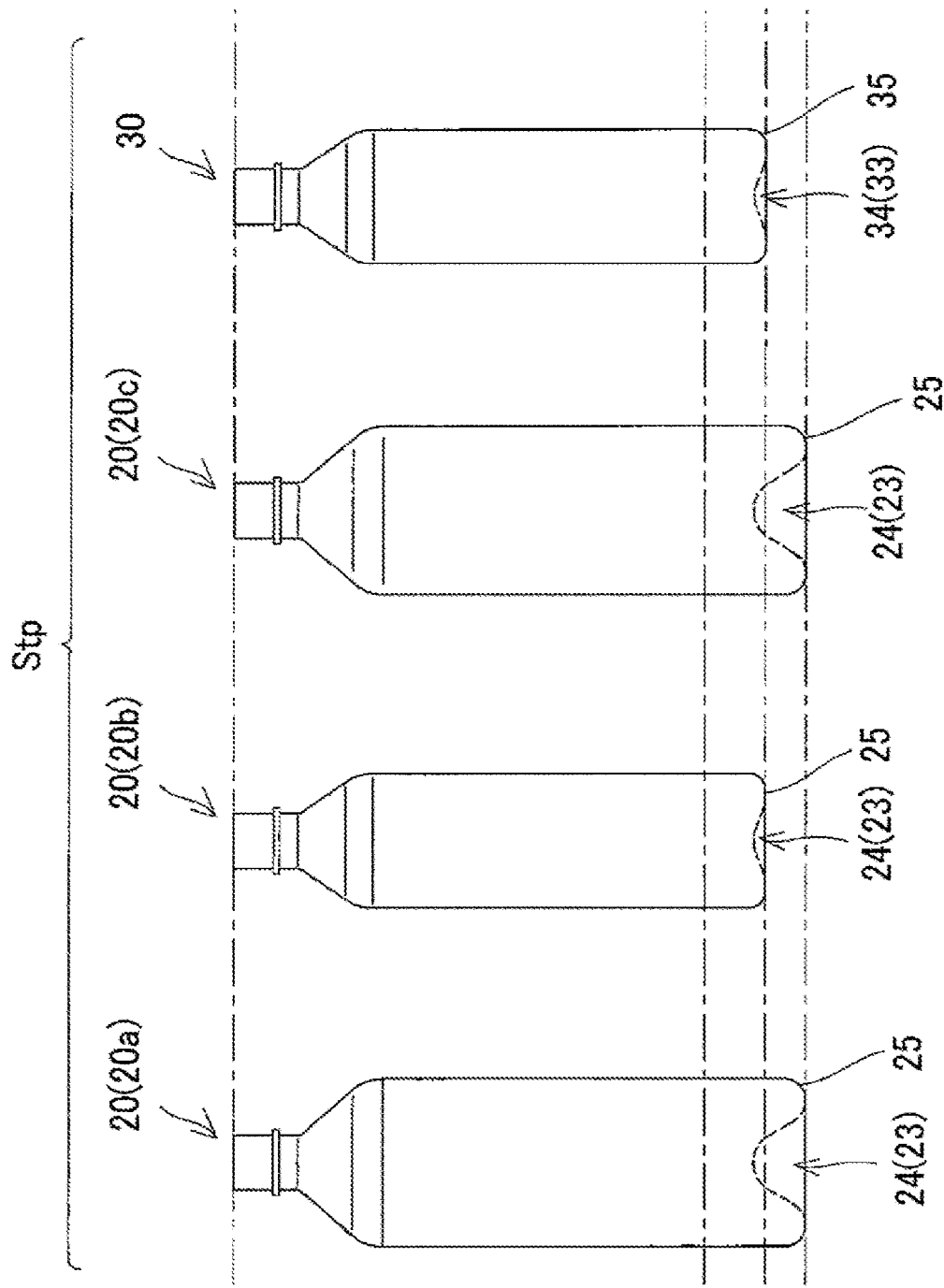

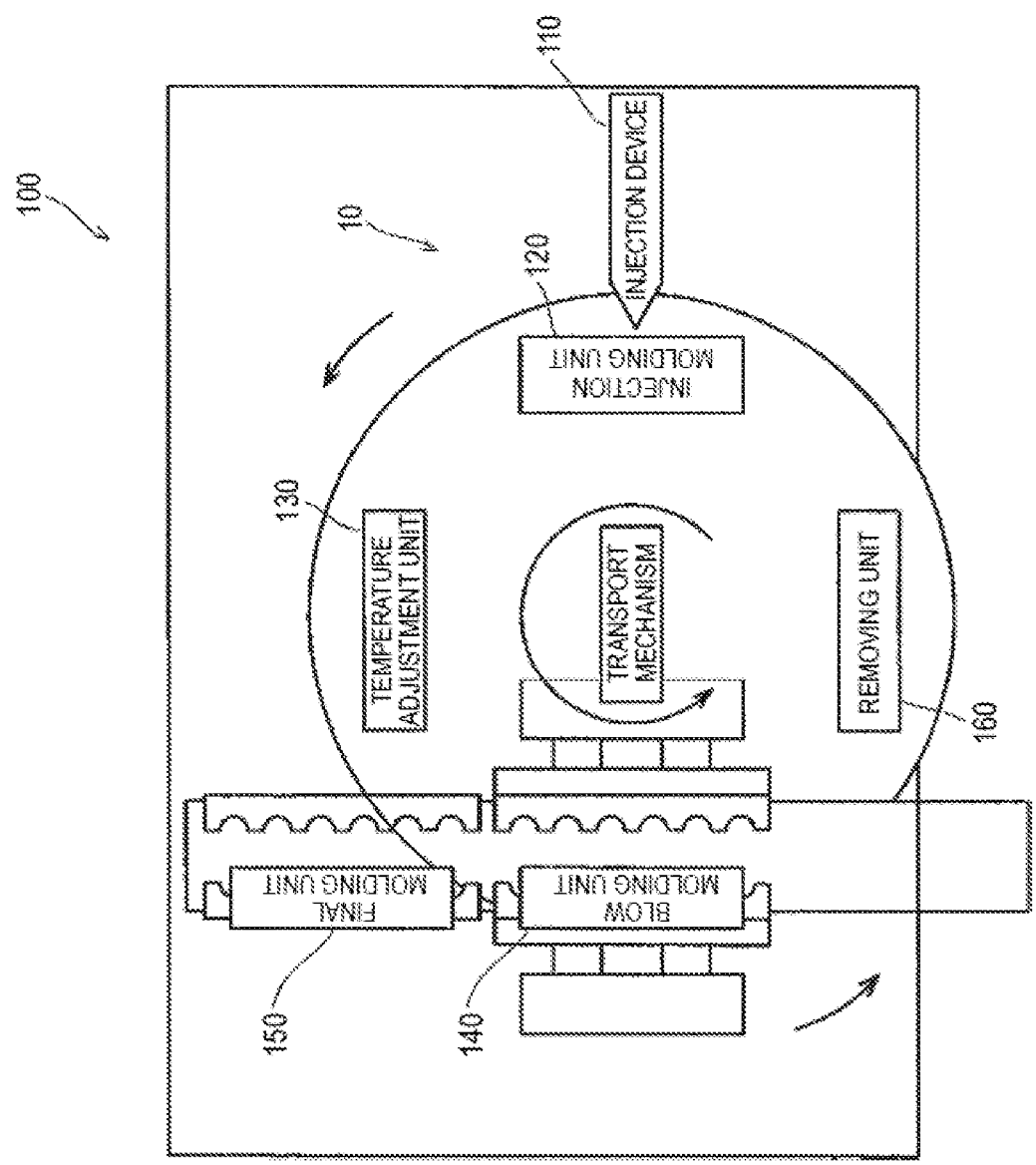
[FIG.3]

[FIG.4]
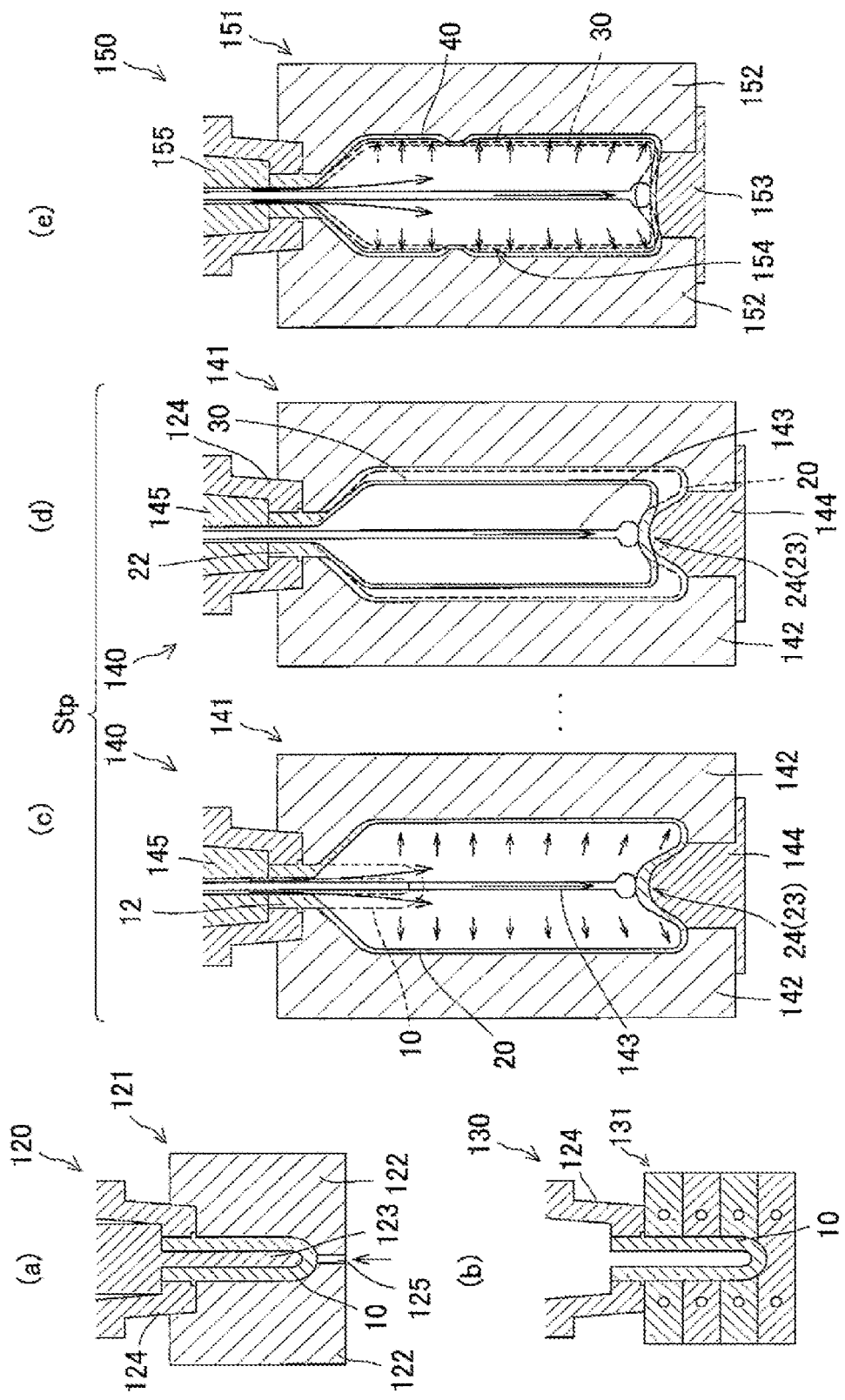

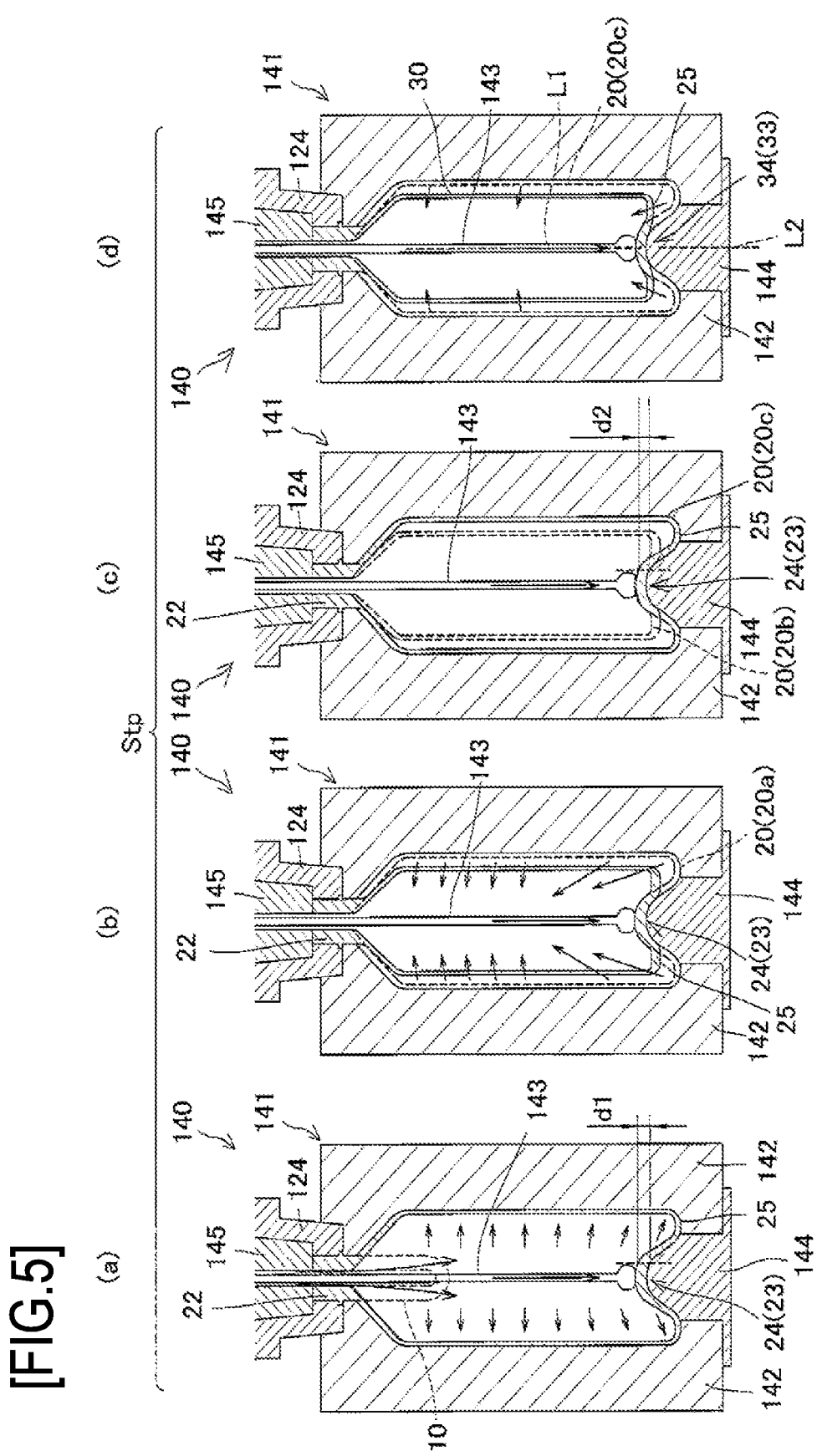
[FIG.5]

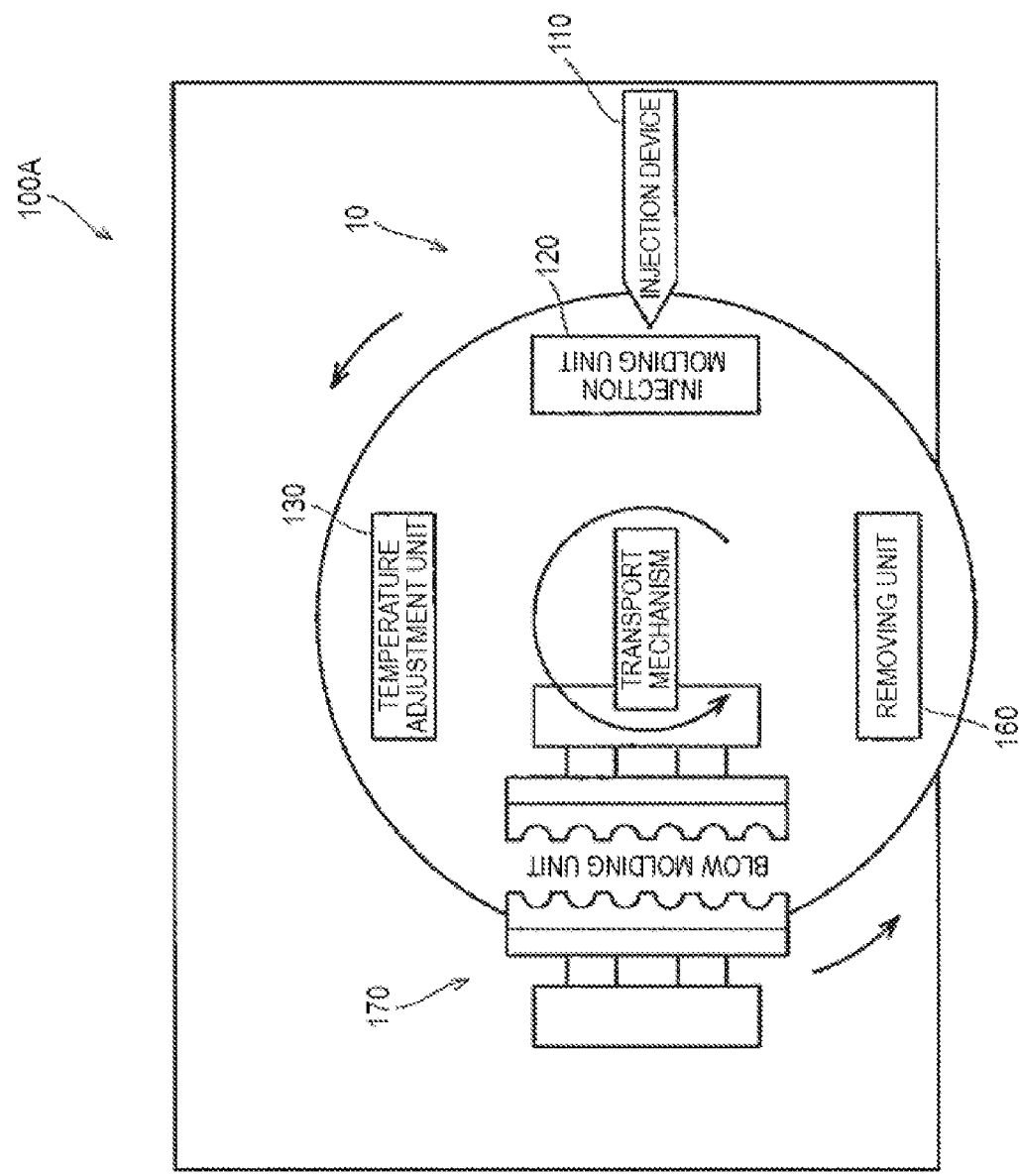
[FIG.6]

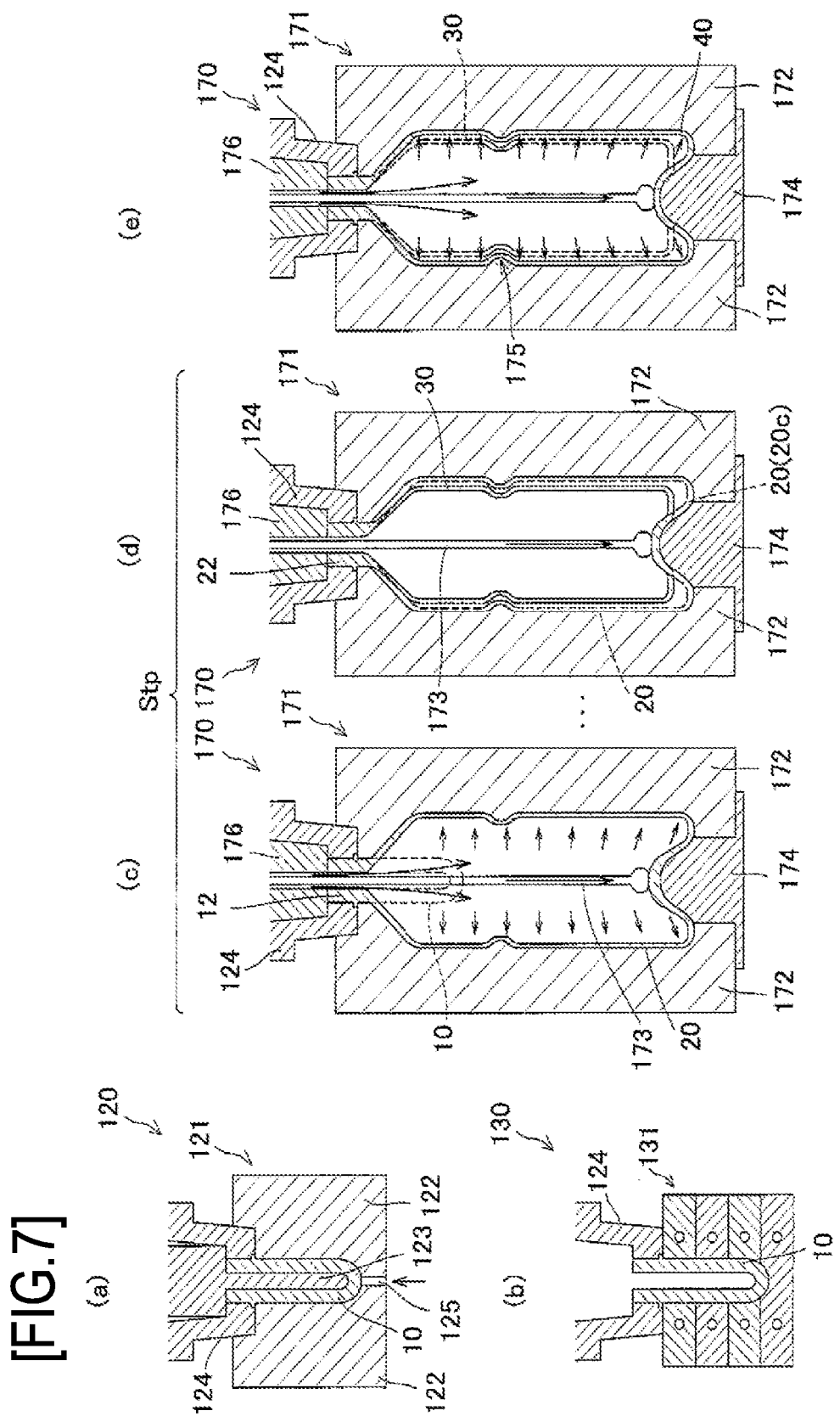

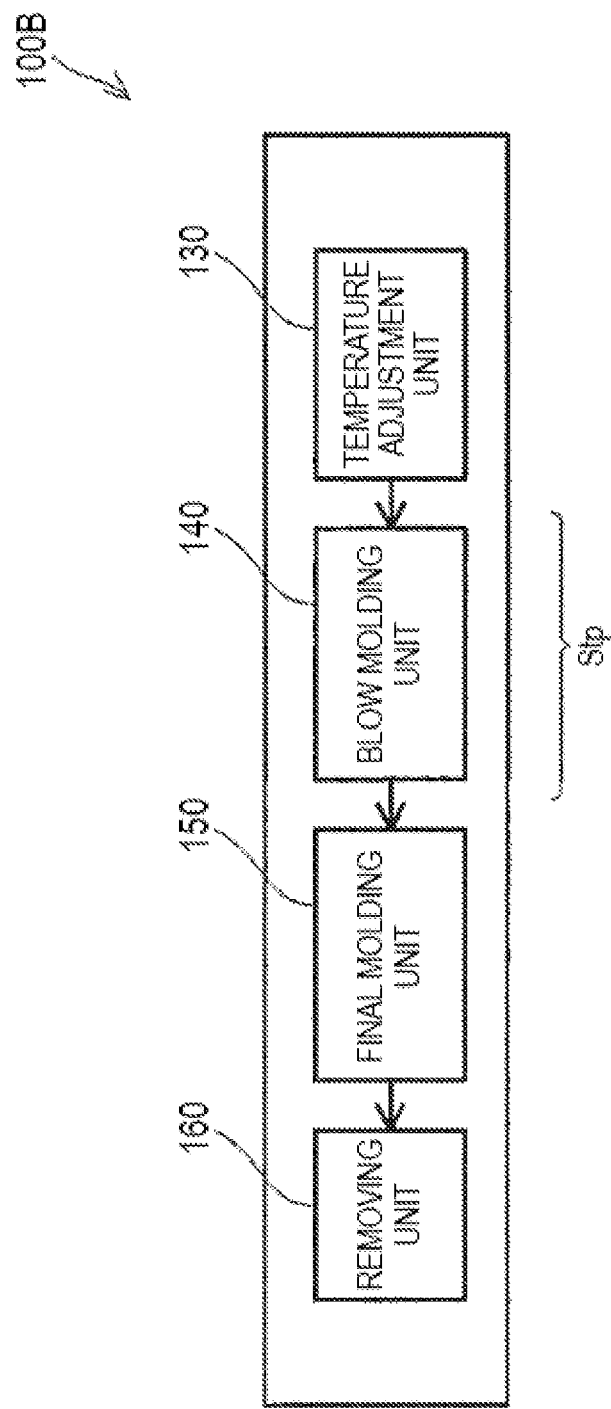

[FIG.9]
(a)
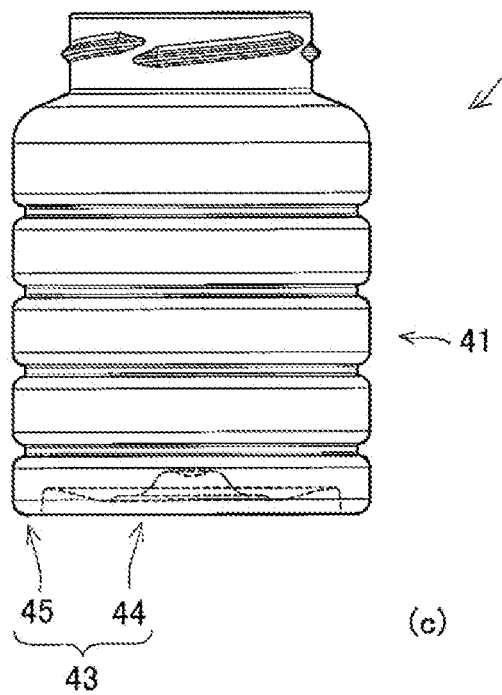
(c)
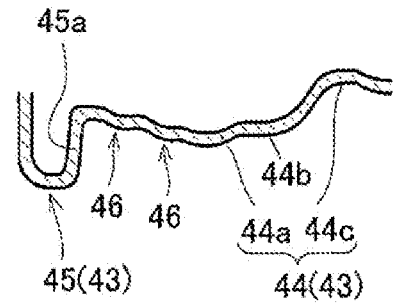
(b)
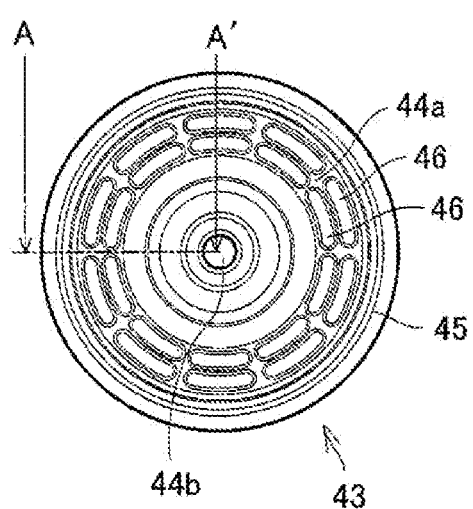
A-A'

[FIG.10]
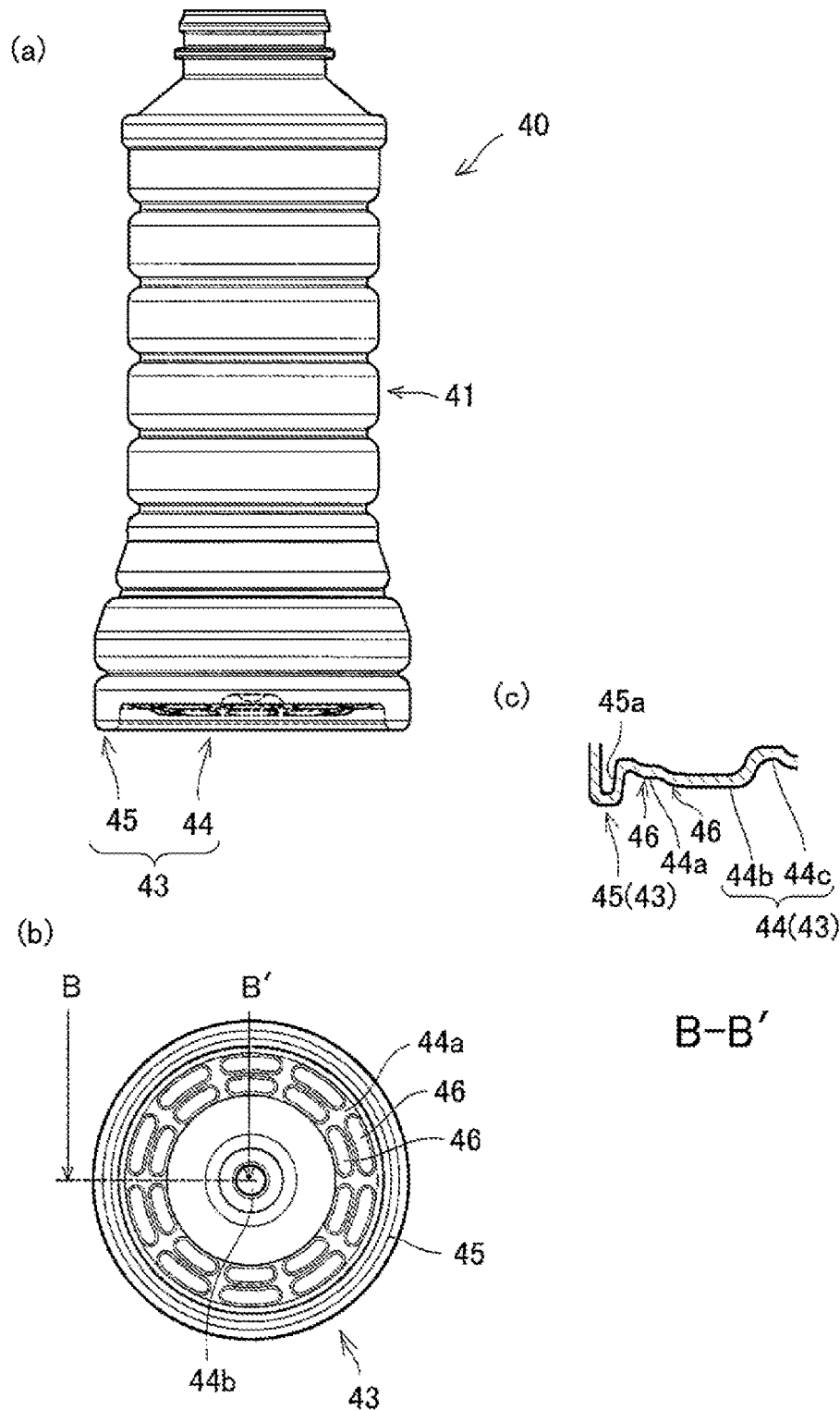

BLOW-MOLDING METHOD AND BLOW-MOLDING APPARATUS

TECHNICAL FIELD

The present invention relates to a blow molding method and a blow molding device.

BACKGROUND ART

In the related art, hollow containers (bottles) formed of thermoplastic resin materials are widely used in society because of being excellent in lightness and durability, being easy to handle, and easily ensuring desired aesthetics. An example of this type of hollow container is a PET bottle that can be filled with a liquid such as a beverage.

Such a hollow container is generally formed by a so-called blow molding method. The blow molding method typically includes a hot parison type in which heat remaining in an injection-molded preform is maintained in the preform and in which the preform at an appropriate temperature for blowing is blown and stretched, and a cold parison type in which a preform cooled to room temperature is separately prepared after injection molding, is heated to an appropriate temperature for blowing, and is then blown and stretched (see, for example, Patent Literature 1).

Also, various blow molding methods for improving heat resistance of the hollow container is proposed. For example, there is a method including: a step of blow-molding a resin preform into a primary blow molded product; a step of holding the primary blow molded product in a heated mold to subject the same to a heat set; a step of taking an intermediate molded product out from the mold and subjecting the contracted intermediate molded product to a heat set outside the mold; and a step of blow-molding the intermediate molded product subjected to the heat set outside the mold in a final blow molding mold to form a final molded product (see Patent Literature 2). There is also a method in which the step of performing a heat set outside the mold as described above is omitted (see Patent Literature 3). The inventions disclosed in Patent Literature 2 and Patent Literature 3 attempt to promote crystallization of the resin by the heat set to improve heat resistance.

CITATION LIST

Patent Literature

Patent Literature 1: JP-A-2013-107391
Patent Literature 2: Japanese Patent No. 3760045
Patent Literature 3: Japanese Patent No. 3907494

SUMMARY OF INVENTION

Technical Problem

Here, in the hot parison type and cold parison type blow molding method described above, the ease of stretching each part (shoulder part, body part, bottom part, etc.) varies depending on a thickness of the preform. Therefore, in either of the methods, there is a possibility that the thickness of the hollow container, which is a final molded product, varies. Variations in thickness may cause, for example, a decrease in various performances of the hollow container such as handleability, rigidity, drop resistance, and top load resistance of the hollow container, and may further impair the aesthetics, quality, and commercial value of the hollow container. Therefore, it is desired that the thickness of the hollow container be made as uniform as possible. In particular, in the hot parison type blow molding method, even when the thickness of the preform is the same, an uneven temperature due to injection molding occurs, so that it is more difficult to mold a hollow container having a uniform (even) thickness.

In the case of forming a heat-resistant container by promoting crystallization of the resin by a heat set as in the inventions according to Patent Literatures 2 and 3, when an uneven thickness distribution is formed in each part of the intermediate molded product, a variation in temperature distribution in each part increases accordingly. As a result, it is difficult to manufacture a heat-resistant container having a uniform thickness. Further, when the thickness of the heat-resistant container is not uniform (not even), in filling the container with contents at a high temperature (for example, about 85° C. to 95° C.), a difference in deformation amount between thin and thick parts tends to be remarkable, and the entire container tends to be distorted. In particular, in the hot parison type blow molding method, the uneven temperature due to injection molding occurs in the preform, so that a degree of uneven thickness (unevenness in thickness distribution intermediate molded product is likely be further increased.

The present invention has been made in view of such circumstances, and an object thereof is to provide a blow molding method and a blow molding device which can improve the degree of uneven thickness of each part of a hollow container.

Solution to Problem

One aspect of the present invention for solving the above problems relates to a blow molding method including: performing a primary blowing on a resin preform to form an intermediate molded product; and performing a final blowing on the intermediate molded product to form a final molded product, in which at least one step of performing the primary blowing and the final blowing includes a thinning step of continuously repeatedly performing, within a predetermined time, steps of: stretching an object by blowing; and contracting stretched parts of the object by exhausting blown air.

Here, the thinning step preferably includes at least: a first step of stretching parts of the object by blowing; a second step of exhausting gas introduced into the object in the first step and contracting each stretched part of the object; a third step of stretching each part of the object by blowing after the second step; and a fourth step of exhausting gas introduced into the object in the third step and contracting each stretched part of the object.

Each of the first step, the second step, the third step, and the fourth step is preferably performed for equal to or shorter than two seconds. The second step is preferably performed in a time shorter than that of the fourth step.

When the step of performing the primary blowing includes the thinning step, it is preferable that, in the first step, each part is stretched while a bottom part of the preform as the object is pressed with a stretching rod.

In the thinning step, a state where the stretching rod abuts against the bottom part of the object is preferably maintained after the blowing in the first step.

In the step of performing the primary blowing, the intermediate molded product is preferably formed using heat remaining in the preform after injection molding.

It is preferable that the primary blowing is a heat set blowing, and the primary blowing promotes crystallization of a resin forming the intermediate molded product.

In addition, another aspect of the present invention relates to a blow molding device including molding means configured to perform, in a blow molding mold, a primary blowing on a resin preform to form an intermediate molded product, the molding means being configured to perform, in a final blow molding mold, a final blowing on the intermediate molded product, in which, when performing at least one of the primary blowing and the final blowing, the molding means, within a predetermined time, continuously repeatedly performs: stretching pails of an object by blowing; and contracting each stretched part of the object by exhausting blown gas.

Advantageous Effects of Invention

According to the blow molding method of the present invention, it is possible to provide a hollow container in which a degree of uneven thickness of each part can be improved, and in particular, a bottom part can be made thinner.

In addition, according to the blow molding device of the present invention, it is possible to provide a hollow container in which the degree of uneven thickness of each part can be improved, and in particular, thinning of the bottom part can be improved.

BRIEF DESCRIPTION OF DRAWINGS

FIG. 1 is a diagram illustrating a blow molding method according to a first embodiment.

FIG. 2 is a diagram illustrating a thinning step (Stp) in the blow molding method according to the first embodiment.

FIG. 3 is a diagram showing a schematic configuration of a blow molding device according to the first embodiment.

FIG. 4 shows diagrams illustrating the blow molding method and the blow molding device according to the first embodiment.

FIG. 5 shows diagrams illustrating the blow molding method and the blow molding device according to the first embodiment.

FIG. 6 is a diagram showing a schematic configuration of a blow molding device according to a second embodiment.

FIG. 7 shows diagrams illustrating a blow molding method and the blow molding device according to the second embodiment.

FIG. 8 is a diagram showing a schematic configuration of a blow molding device according to a third embodiment.

FIG. 9 shows diagrams illustrating an example of a hollow container formed by blow molding.

FIG. 10 shows diagrams illustrating an example of the hollow container formed by blow molding.

DESCRIPTION OF EMBODIMENTS

Embodiments will be described with reference to the drawings. The following embodiments are aspects of the present invention, and can be optionally changed within the scope of the present invention. In the drawings and the description, the same members are denoted by the same reference numerals, and repeated description is omitted.

First Embodiment

FIG. 1 and FIG. 2 are diagrams illustrating a blow molding method according to the present embodiment. FIG. 1 is a diagram showing an overall flow of the blow molding method. FIG. 2 is a diagram showing a flow of a thinning step (Stp) included in the blow molding method.

As shown in FIG. 1 and FIG. 2, the blow molding method according to the present embodiment includes: performing a primary blowing including a plurality of blowing steps on a resin preform 10 to form an intermediate molded product 30 with an improved degree of uneven thickness; and further performing a final blowing (secondary blowing) on the intermediate molded product 30 to form a hollow container 40. As will be described later in detail, in this method, the intermediate molded product 30 is formed from the preform 10 formed by injection molding through primary molded products 20 (20a to 20c), and the hollow container 40 as a final molded product is formed by performing the final blowing (secondary blowing) on the intermediate molded product 30.

The blow molding method according to the present embodiment is a so-called hot parison type blow molding method for blowing the preform 10 adjusted to an appropriate temperature for blowing using heat remaining in the preform 10 after injection molding. Since the preform 10 here is made of polyethylene terephthalate (PET), various blow temperatures are appropriately adjusted based on the crystallization temperature, softening point, and the like of PET. However, a resin material constituting the preform 10 is not limited to PET, and may be another resin material containing PET or different from PET.

The intermediate molded product 30 is formed by the primary blowing (in the present embodiment, heat set blowing) as described above. Of course, the primary molded products 20 (20a to 20c) obtained in the process of molding the intermediate molded product 30 are also formed by the primary blowing.

In detail, the primary blowing (heat set blowing) includes a thinning step of continuously repeatedly performing a predetermined blowing step and a predetermined exhausting step for a plurality of times within a predetermined time. In the blowing step, parts of an object such as the preform 10 and the primary molded product 20 is stretched. In the exhausting step, each stretched part of the primary molded product 20 is contracted by exhausting the blown gas (for example, air), that is, by discharging the blown gas from the primary molded product 20 as the object. Each part referred to in the present embodiment is, for example, a shoulder part, a body part, a bottom part, and the like of the primary molded product 20.

Generally, in the hot parison type blow molding method, the ease with which each part of the preform is stretched is determined by the thickness of each part. That is, a relatively thick part (such as the body part) of the preform has a higher residual heat and is more likely to be stretched. In other words, a relatively thin part (such as the bottom part) of the preform has a lower residual heat and is not easily to be stretched. Therefore, for example, when forming a hollow container from a preform using the hot parison type blow molding method, a part (such as the body part), corresponding to a thick part of the preform, of the hollow container 40 is easily to be relatively thin, and a part (such as the bottom part), corresponding to a thin part of the preform, of the hollow container 40 is easily to be relatively thick.

However, by performing the above thinning step, the thick part (particularly, the bottom part) can be stretched each time the blowing step is repeatedly performed. Therefore, the bottom part of the hollow container 40 that is likely to be thick can be suitably thinned. In addition, the thickness of each part can be stretched in a well-balanced manner throughout the thinning step. That is, with such a thinning step, the degree of uneven thickness of the hollow container 40 as the final molded product can be improved, in other words, the thickness of the hollow container 40 can be made uniform.

In the present embodiment, the thinning step includes at least: a first blowing step (first step); a first exhausting step (second step); a second blowing step (third step); and a second exhausting step (fourth step). In such a thinning step, the blowing step and the exhausting step are performed alternately within a predetermined time. Each of these steps is continuously performed for equal to or shorter than a predetermined time (for example; 2 seconds).

In the thinning step, the intermediate molded product 30 is formed in the second exhausting step through the primary molded product 20 (20*a*) formed in the first blowing step, the primary molded product 20 (20*b*) formed in the first exhausting step, and the primary molded product 20 (20*c*) formed in the second blowing step.

The hollow container 40 as the final molded product is a container (so-called PET bottle) that can be filled with a liquid such as a beverage. For example, a body part 41 of the hollow container 40 is formed with a concave part 42 in a circumferential direction corresponding to a shape of a final blow molding mold when performing the final blowing (see FIG. 1). Also, in the hollow container 40, a bottom part 43 of the hollow container 40 is formed with an upper bottom part 44 protruding in a convex shape inwardly of the container. A foot of the hollow container 40 is formed with a foot part 45 (heel part) surrounding the upper bottom part 44 in the circumferential direction (see FIG. 2).

Similar to the hollow container 40, in the primary molded product 20 obtained in the process of forming the hollow container 40 from the preform 10, a bottom part 23 of the primary molded product 20 is formed with an upper bottom part 24 protruding in a convex shape inwardly of the molded product. A foot of the primary molded product 20 is formed with a foot part 25 (heel part) surrounding the upper bottom part 24 in the circumferential direction. Also, in the intermediate molded product 30, a bottom part 33 of the intermediate molded product 30 is formed with an upper bottom part 34 and a foot part (heel part) 35.

FIG. 3 is a diagram showing a schematic configuration of a blow molding device 100 according to the present embodiment. As shown in FIG. 3, the blow molding device 100 is a device (intermittent rotation transport type) in which the preform 10, the primary molded product 20, the intermediate molded product 30, and the hollow container 40 are sequentially intermittently rotated and transported to a next step. The blow molding device 100 includes five stations on a machine base, the five stations including: an injection molding unit 120 to which an injection device 110 is connected; a temperature adjustment unit 130; a blow molding unit (intermediate molding unit: primary blow molding unit) 140; a final molding unit (secondary blow molding unit) 150; and a removing unit 160. Above the five stations, a rotation plate (transfer plate) (not shown) is rotatably provided, and the rotation plate supports a neck mold (described later) for holding and transporting the molded product. Among these units, the above thinning step is performed mainly with the blow molding unit (intermediate molding unit) 140. The blow molding unit 140 and the final molding unit 150 are slidably mounted on the machine base, and are alternately moved with respect to the neck mold supported by the rotation plate.

FIG. 4 and FIG. 5 are diagrams illustrating the configuration and operation of the blow molding device 100 and the blow molding method according to the present embodiment. FIG. 4 shows diagrams corresponding to the entire flow of the blow molding method. FIG. 5 shows diagrams corresponding to the thinning step (Stp) included in the blow molding method.

The injection molding unit 120 injection-molds a preform using PET injected from the injection device 110 (part (a) of FIG. 4). The injection molding unit 120 includes an injection molding mold 121 connected to the injection device 110. The injection molding mold 121 includes an injection cavity mold 122 for defining an outer surface of a body part of the preform 10 and a core mold 123 for defining an inner surface of the preform 10. At an upper part of the injection molding mold 121, a neck mold 124 is provided. The neck mold 124 is composed of split molds openable and closable in a horizontal direction and defining an outer wall surface of a neck part of the preform 10 which is a molded product.

In the injection molding unit 120, the preform 10 is formed by filling the injection cavity mold 122 with PET as a raw material via a gate 125 provided at a center of a bottom part of the injection cavity mold 122. The injection-molded preform 10 is transported to the temperature adjustment unit 130 in a state of being held by the neck mold 124.

The temperature adjustment unit 130 adjusts a temperature of the preform 10 before blow molding in the blow molding unit (intermediate molding unit) 140 (temperature adjustment step: part (b) of FIG. 4). The temperature adjustment unit 130 includes, for example, a temperature adjustment pot 131 for accommodating the preform 10. The temperature adjustment pot 131 is used to adjust the temperature so as to reach an appropriate PET stretching temperature for example, about 80° C. to 90° C.) While using the heat remaining in the preform 10 after injection molding. The preform 10 adjusted (heated) to a predetermined appropriate stretching temperature is then transported to the blow molding unit 140.

The blow molding unit 140, together with the subsequent final molding unit 150, constitutes molding means according to the present embodiment. The blow molding unit 140 is a part for performing a primary blowing (in the present embodiment, heat set blowing), and forms the intermediate molded product 30 from the preform 10 through the primary molded product 20 (see parts (c) and (d) of FIG. 4). The blow molding unit 140 includes a blow molding mold 141. The blow molding mold 141 includes a pair of openable and closable blow molding split molds 142, a stretching rod 143, and a blow bottom mold 144. In the present embodiment, the heat set blowing is performed as the primary blowing, but the primary blowing may be a blowing without a heat set.

The stretching rod 143 is movable in a longitudinal direction (up-down direction) through a blow core 145 fitted into a mouth part 12 of the preform 10. Also, the blow molding unit 140 includes a supply unit (not shown) for supplying air (pressurized gas) via the blow core 145.

In the blow molding unit 140, the bottom part of the preform 10 disposed in the blow molding mold 141 as a primary blow mold (heat set blow mold) is pressed from an inside of the container with the stretching rod 143, and thus, the preform 10 is stretched in the longitudinal direction. In addition, air is supplied from the supply unit and the preform 10 is stretched in a radial direction to come into contact with inner wall surfaces of the blow molding mold 141 and the blow bottom mold 144 heated to a temperature equal to or higher than the crystallization of PET (for example, about 180° C. to 200° C.).

Accordingly, the primary molded product 20 (20*a*) having a size larger than that of the hollow container 40 is molded (first blowing step: part (a) of FIG. 5). In such a first blowing step, a residual stress of PET can be reduced, and a crystallization density of PET can be improved.

As described above, the ease with which each part is stretched varies depending on the thickness of the preform 10 and the like. That is, a large thickness part of the preform 10 has a large residual heat amount and is easily stretched in the first blowing step. Therefore, in the stretching of the preform 10 in the first blowing step, the stretching of the body part is firstly performed, and the stretching of the bottom part is then performed. That is, in the first blowing step, the body part of the preform 10 is stretched relatively large, but the bottom part is stretched relatively small. Therefore, the bottom part 23 of the primary molded product 20a formed in the first blowing step is relatively thicker than the body part.

In the present embodiment, a height from the foot part 45 to the upper bottom part 44 of the hollow container 40 as the final molded product is lower than a height from the foot part 25 to the upper bottom part 24 of the primary molded product 20a. That is, the primary molded product 20a has the bottom part whose position is higher than that of the hollow container 40. As a result, the bottom part 23 (particularly, the upper bottom part 24) of the primary molded product 20a cannot be completely stretched by only one blow processing (first blowing step), and is likely to be thicker than the body part.

After the first blowing step, the blow molding unit 140 exhausts the air blown in the first blowing step via the blow core 145, and contracts each stretched part of the primary molded product 20a (first exhausting step: part (b) of FIG. 5). The exhausting can be performed by opening an exhaust valve (not shown) on an upper part of the blow core 145.

A degree of contraction at this time is relatively large. In the primary molded product 20a, an amount by which the foot part 25 surrounding the upper bottom part 24 in the circumferential direction is pulled up toward a mouth part 22 is larger than an amount by which a part, abutted against the stretching rod 143, of the upper bottom part 24 is pulled up toward the mouth part 22. At the same time, each part other than the foot part 25 also contracts. As a result, the primary molded product 20b having a size smaller than that of the primary molded product 20a is obtained (part (b) of FIG. 5). At this time, the resin of the upper bottom part 24 having a large thickness and a large residual heat amount is pulled toward the foot part 25. Therefore, in the upper bottom part 24, a difference in thickness between a central region in contact with the stretching rod 143 and a peripheral region not in contact with the stretching rod 143 is reduced. The residual heat amount of the foot part 25 and the body part of the primary molded product 20a that is highly stretched by the first blowing step is relatively smaller than that of the upper bottom part 24.

After the exhausting in the first exhausting step, the blow molding unit 140 supplies air from the supply unit via the blow core 145 from the mouth part 22 of the primary molded product 20b while continuously performing the heat set on the primary molded product 20b. Accordingly, each part of the primary molded product 20b is stretched to form the primary molded product 20c (second blowing step: part (c) of FIG. 5). At this time, the bottom part 23 (upper bottom part 24) is particularly stretched. This is because the bottom part 23 (upper bottom part 24) has a low degree of stretching in the above first blowing step and is maintained relatively thick, and has a residual heat amount larger than other parts at the stage of the second blowing step.

According to the second blowing step, the bottom part 23 is further stretched in the blow molding mold 141, and accordingly the thinning of the bottom part 23 is achieved. A thickness d2 of the bottom part 23 of the primary molded product 20c is smaller than a thickness d1 of the bottom part 23 of the primary molded product 20a.

The thickness d1 of the bottom part 23 of the primary molded product 20a and the thickness d2 of the bottom part 23 of the primary molded product 20c indicate a thickness of an outer peripheral region, between the central region of the upper bottom part 24 in contact with the stretching rod 143 and the foot part 25, of the upper bottom part 24 that is not in contact with the stretching rod 143. Each part (shoulder part, body part, etc.) other than the bottom part 23 is also stretched twice, though not as much as the bottom part 23, to form the primary molded product 20c in which the thickness of each part is balanced. In addition, since the residual stress of PET can be reduced and the crystallization density of PET can be improved by the first blowing step and the second blowing step, the heat resistance of the finally obtained hollow container 40 can be improved.

After the second blowing step, the blow molding unit 140 exhausts the air blown in the second blowing step via the blow core 145, and contracts each stretched part of the primary molded product 20c (second exhausting step: part (d) of FIG. 5). Accordingly, the intermediate molded product 30 having a size smaller than that of the hollow container 40 is formed. The intermediate molded product 30 is formed in a size slightly larger than that of the primary molded product 20b.

In the steps after the first blowing step (i.e. the first exhausting step, the second blowing step and the second exhausting step), the blow molding unit 140 keeps the stretching rod 143 in a position of being pushed down in the longitudinal direction. Accordingly, a state where the stretching rod 143 is in contact with inner wall surfaces of the bottom part 23 of the primary molded product 20 and the bottom part 33 of the intermediate molded product 30 is maintained. Therefore, when the primary molded product 20 is blow-molded or contracted, a displacement of the bottom part 23 with respect to a central axis of the primary molded product 20 and a displacement of the bottom part 33 with respect to a central axis of the intermediate molded product 30 can be reliably prevented.

In part (d) of FIG. 5, a center line L1 of the intermediate molded product 30 (stretching rod 143) and a center line L2 of the upper bottom part 34 protruding in a convex shape are substantially coincident with each other. The prevention of the displacement between the two center lines makes it easier to improve the degree of uneven thickness of the hollow container 40.

In the thinning step, the blowing and the exhausting are continuously repeatedly performed. The thick part of the primary molded product 20 is thinned and the overall degree of uneven thickness is improved. Along with this, the residual heat amount of each part of the primary molded product 20 also decreases, and the degree of stretching or contraction of the primary molded product 20 in response to the blowing and the exhausting decreases. For example, since thinning of the bottom part 23 is particularly achieved in the above second blowing step, the degree of contraction of the bottom part 23 in the second exhausting step is smaller than that in the first exhausting step.

The intermediate molded product 30 obtained by the second exhausting step is required to have a size smaller than that of the hollow container 40 so as to be held in a next final blow molding mold 151. Nevertheless, the intermediate molded product 30 preferably has a size close to the size of the hollow container 40 as the final molded product. Therefore, during a final blowing (secondary blowing), the degree of stretching of the intermediate molded product 30 can be kept small, and the stress that can remain in the hollow container 40 formed by the final blowing can be reduced. As a result, for example, the hollow container 40 that can appropriately prevent deformation due to heat is obtained.

As described above, after the thinning step performed mainly with the blow molding unit 140, the preform 10 becomes the intermediate molded product 30 slightly smaller than the hollow container 40 as the final molded product. The intermediate molded product 30 is transported to the final molding unit 150 in a state of being held by the neck mold 124.

The final molding unit 150, together with the blow molding unit 140, constitutes a part of the molding unit according to the present embodiment. In the final molding unit 150, the intermediate molded product 30 is blow-molded to form the hollow container 40 (final molding step: part (e) of FIG. 4). The final molding unit 150 includes the final blow molding mold 151. The final blow molding mold 151 includes an openable and closable final blow molding split mold 152 and a final blow bottom mold 153.

The final blow molding split mold 152 has an inner wall surface along an outer shape of the hollow container 40. The inner wall surface is provided with a convex part 154 protruding inward at a position corresponding to the concave part 42 of the hollow container 40. The final molding unit 150 includes a supply unit for supplying air (pressurized gas) a blow core mold.

Then, air is supplied from the supply unit via the blow core into the intermediate molded product 30 disposed in the final blow molding mold 151. The intermediate molded product is stretched in the longitudinal direction and the radial direction to come into contact with an inner wall surface of the final blow molding split mold 152 heated to a predetermined temperature (for example, about 100° C. to 120° C.). Thereafter, cooling is performed by circulation of the blown air. Accordingly, the hollow container 40 is formed. Thereafter, the hollow container 40 is transported to the removing unit 160 and removed from the removing unit 160 to the device.

According to the blow molding method and the blow molding device 100 described above, in the thinning step of the blow molding unit 140, the blowing step and the exhausting step are continuously repeatedly performed within a predetermined time. In the first blowing step, since the body part of the preform 10 is mainly stretched, the bottom part 23 of the primary molded product 20a is maintained thicker than the body part. Even after the contraction in the next first exhausting step, the bottom part 23 of the primary molded product 20b is maintained thick. Accordingly, in the next second blowing step, the bottom part 23 having a relative large thickness and a large residual heat amount is preferably stretched and thinned, and the thickness of the bottom part 23 of the primary molded product 20c is made relatively uniform.

Though not as much as the bottom part 23, each part other than the bottom part 23 is stretched again in the second blowing step, so that the thickness of each part of the primary molded product 20c is balanced. As the thick part is thinned and the overall degree of uneven thickness is improved, the residual heat amount of each part of the primary molded product 20c is also reduced. Therefore, large contraction of the primary molded product 20c accompanying the next second exhausting step is also avoided.

Therefore, according to the blow molding method and the blow molding device 100, since the above thinning step is performed, the degree of uneven thickness of the intermediate molded product 30 can be improved. Also, the degree of uneven thickness of the hollow container 40 obtained by final-blowing the intermediate molded product 30 can also be improved. In particular, the height and thickness of the bottom part 43 of the hollow container 40 can be increased and the thickness of the bottom part 43 can be made uniform. Further, by performing the heat set blowing as the primary blowing in the molding step, the crystallization of the resin can be promoted. Thus, the heat resistance of the obtained hollow container 40 can be improved.

In the present embodiment, each of the blowing and the exhausting intermittently performed in the thinning step is performed in a short time of equal to or shorter than 2 seconds. Therefore, even when such blowing and exhausting are repeatedly performed, the entire manufacturing time does not significantly increase. Consequently, the present embodiment is also suitable for mass production, and can meet the expectation of ensuring excellent manufacturing efficiency and container quality in response to the increasing use of hollow containers in recent years.

The time for performing the first blowing step in the above thinning step is, for example, 0.7 second to 0.8 second. The time for performing the first blowing step can be appropriately adjusted based on the degree of stretching of the preform 10, the time sufficient for subjecting the PET (primary molded product 20a) to the heat set, or the like.

The time for performing the first exhausting step in the thinning step is, for example, about 0.5 second to 0.6 second. The time for performing the first exhausting step can be appropriately adjusted based on the time required for exhausting the blown air or the like. The time is preferably shortened from the viewpoint of suitably reducing the thickness of the bottom part 23 of the primary molded product 20b in the next second blowing step. As a criterion, the first exhausting step is preferably performed in a time shorter than the subsequent second exhausting step, for example.

The time for performing the second blowing step is, for example, about 1.2 seconds to 1.3 seconds. The time for performing the second blowing step can be appropriately adjusted based on the degree of stretching of each part of the preform 10, the time sufficient for subjecting the PET (primary molded product 20b) to the heat set, or the like.

The time for performing the second exhausting step is, for example, about 0.9 second to 1.1 seconds. The time for performing the second exhausting step is longer than that for the first exhausting step though the second exhausting step and the first exhausting step are the exhausting step. When the time for performing the second exhausting step is relatively long, the degree of contraction accompanying the second exhausting step can be prevented as small as possible.

The time for performing these steps can be adjusted back from the size of the hollow container 40 or the intermediate molded product 30. As described above, the intermediate molded product 30 obtained by the primary blow molding (thinning step) preferably has a size close to the size of the hollow container 40 as the final molded product. Therefore, the time for performing these steps is adjusted in consideration of the degree of stretching of each part of the primary molded product 20 or the like accompanying the blowing step and the degree of contraction of each part of the primary molded product 20 accompanying the exhausting step, so as to obtain the intermediate molded product 30 having a size close to the size of the hollow container 40.

As the blow molding method and the blow molding device 100, a hot parison type is used. In the hot parison type blow molding method, the temperature of the preform is adjusted (temperature adjustment step) before the primary blowing (heat set blowing) is performed. However, when removal of uneven temperature and equalization are prioritized, it is often difficult to provide a suitable temperature distribution in a bottom part region of the preform, and in the related art, it is often difficult to make the bottom part of the hollow container thinner in general. In contrast, according to the present embodiment, even when such a hot parison type blow molding method is used, the degree of stretching of the bottom part 43 of the hollow container 40 can be increased to reduce the thickness, and the degree of uneven thickness can be improved. Accordingly, the thickness of the body part and the bottom part of the hollow container 40 can be reduced to substantially equal thicknesses, and the heat resistance, rigidity, and lightweight of the hollow container 40 can be improved. As a result of the degree of stretching of the bottom part 43 of the hollow container 40 being increased, crack resistance (drop resistance) of the bottom part 43 against falling can also be improved.

The blow molding method and the blow molding device 100 according to the present embodiment are not limited to the hot parison type, and can be suitably implemented even with a cold parison type. Further, the thinning step is not limited to being performed during the heat set blowing, and may be performed during the final blowing.

Second Embodiment

Although the blow molding method and the blow molding device according to the present embodiment have basically the same structure as that of the first embodiment, the configuration of the blow molding unit is different. Hereinafter, different parts will be mainly described.

FIG. 6 is a diagram showing a schematic configuration of a blow molding device 100A according to the present embodiment. As shown in FIG. 6, the blow molding device 100A is a rotary transport type device in which the injection molding unit 120, the temperature adjustment unit 130, a blow molding unit 170, and the removing unit 160 are disposed around the transport mechanism along a transport direction. The injection molding unit 120, the temperature adjustment unit 130, and the removing unit 160 are as described in the first embodiment. The blow molding unit 170 is a station that serves as the blow molding unit 140 and the final molding unit 150 described in the first embodiment.

FIG. 7 shows diagrams illustrating the configuration and operation of the blow molding device 100A and the blow molding method according to the present embodiment. The step represented by Stp in the figure corresponds to the thinning step described in the first embodiment.

The blow molding unit 170 includes a blow molding mold 171. The blow molding mold 171 includes an openable and closable blow molding split mold 172, a stretching rod 173, and a blow bottom mold 174. An inner wall surface of the blow molding split mold 172 is provided with a convex part 175 corresponding to the concave part 42 of the hollow container 40. The stretching rod 173 is movable in a longitudinal direction through a blow core 176 fitted into the mouth part 12 of the preform 10. The blow molding unit 170 includes a supply unit for supplying air (pressurized gas) via the blow core 176.

In the blow molding method and blow molding device 100A according to the present embodiment, the preform 10 is injection-molded by the injection molding unit 120 and the preform 10 is heated by the temperature adjustment unit 130. Then, the preform 10 is transported to the blow molding unit 170 and disposed in the blow molding mold 171.

In the blow molding unit 170, first, the preform 10 disposed in the blow molding mold 171 is stretched in the longitudinal direction by the stretching rod 173 (part (c) of FIG. 7). Then, the air is supplied from the supply unit, and the preform 10 is stretched in the radial direction to come into contact with an inner wall surface of the blow molding mold 171 set to a predetermined temperature (primary blowing). Accordingly, the primary molded product 20 having a size same as that of the hollow container 40 is formed (first blowing step: part (c) of FIG. 7). The blow molding mold 171 (the blow molding split mold 172 and the blow bottom mold 174) is desirably set to a temperature equal to or higher than the crystallization of PET (for example, about 80° C. to 100° C.), but the blow molding mold 171 may be set to room temperature (for example, about 20° C.).

Thereafter, with the first exhausting step, the second blowing step, and the second exhausting step described in the first embodiment, exhausting, blowing and exhausting are intermittently performed using the blow molding mold 171 within a predetermined time. Each part of the primary molded product 20 is contracted by the exhausting in the second exhausting step, and the intermediate molded product 30 having a size slightly smaller than that of the hollow container 40 as the final molded product is formed (part (d) of FIG. 7).

Then, the intermediate molded product 30 is further blow-molded in the blow molding mold 171 to form the hollow container 40 (part (e) of FIG. 7). In the present embodiment, during the final blowing, a state where the stretching rod 173 is inserted into the intermediate molded product 30 is maintained, and the stretching rod 173 can be removed. Thereafter, similar to the first embodiment, the hollow container 40 is transported to the removing 160, and taken out of the device from the removing unit 160.

According to the present embodiment described above, similar to the first embodiment, the degree of uneven thickness can be improved, and particularly, the bottom part can be made thinner. Also, if the temperature of the blow molding mold 171 and the blow bottom mold 174 is set lower than the temperature in the first embodiment but higher than the crystallization temperature of the resin, the heat resistance of the obtained hollow container 40 can be improved. Further, as a result of the degree of stretching of the bottom part 43 of the hollow container 40 being increased, the crack resistance (drop resistance) of the bottom part 43 against falling can also be improved.

Further, according to the present embodiment, the device used for manufacturing the hollow container 40 can be simplified in that the molding (improvement in degree of uneven thickness with the thinning step) by the primary blowing and the molding (final shaping of the hollow container 40) by the final blowing are performed in single blow molding mold 171. Therefore, similar to the first embodiment, the present embodiment is also suitable for mass production, and can meet the expectation of ensuring excellent manufacturing efficiency and container quality in response to the increasing use of hollow containers in recent years.

Third Embodiment

A blow molding method and a blow molding device according to the present embodiment differ from the first embodiment in that a cold parison type is used. Hereinafter, different parts will be mainly described.

FIG. 8 is a diagram showing a schematic configuration of a blow molding device 100B according to the present embodiment.

In the present embodiment, a preform cooled to room temperature after injection molding is separately prepared. The preform is heated to an appropriate temperature for blowing by a heater or the like, and then the preform is blown and stretched. Therefore, in the blow molding method according to the present embodiment, the step of injection-molding a preform as described in the first embodiment is not performed.

As shown in FIG. 8, the blow molding device 100B according to the present embodiment includes the temperature adjustment unit (heating unit) 130, the blow molding unit 140, the final molding unit 150, and the removing unit 160, but does not include the injection molding unit 120 described in the first embodiment The temperature adjustment unit (heating unit) 130 includes a plurality of bar-shaped heaters disposed at predetermined intervals in the longitudinal direction of the preform 10, and heats the separately prepared normal-temperature preform to adjust the temperature to an appropriate temperature for blow molding (temperature adjustment step and heating step). Thereafter, similar to the first embodiment, the thinning step is performed mainly with the blow molding unit 140, and a final blowing is performed to obtain the hollow container 40 as the final molded product.

According to the present embodiment described above, even in the case of the cold parison type, the thinning step is performed as in the first embodiment, so that the degree of uneven thickness of the hollow container 40 can be improved, and particularly, the thinning of the bottom part can be achieved. Also, the crystallization of the resin can be promoted by performing the heat set blowing as the primary blowing with the blow molding unit 140, and thus, the heat resistance of the obtained hollow container 40 can also be improved.

In addition, similar to the first embodiment, the blow molding device 100B according to the present embodiment is also suitable for mass production, and can meet the expectation of ensuring excellent manufacturing efficiency and container quality in response to the increasing use of hollow containers in recent years.

Other Embodiments

One mode of the blow molding method and the blow molding device according to the present embodiment has been described above, but the present invention is not limited to any one of the first to third embodiments. The first to third embodiments described above can be combined with each other within the scope of the present invention.

For example, the shape of the hollow container formed by the blow molding method and the blow molding device according to the above-described embodiments is not particularly limited.

FIG. 9 and FIG. 10 are diagrams showing other examples of the hollow container formed by blow molding, in which (a) is a front view, (b) is a bottom view, and (c) is a cross-sectional view of the bottom part. In the above embodiments, the body part 41 of the hollow container 40 is formed in a shape that functions as a reduced-pressure absorption panel part. However, for example, the hollow container 40 may be formed such that the bottom part 43 functions as a reduced-pressure absorption panel part, as shown in FIG. 9 and FIG. 10. The reduced-pressure absorption panel part is formed in a shape that is easier to deform than other parts. The reduced-pressure absorption panel part is deformed due to internal pressure reduction when the hollow container 40 is cooled after being filled with contents in a high temperature state and sealed with a lid. The hollow container 40 of FIG. 9 and FIG. 10 is in a state where the contents in the high-temperature state is not filled. That is, the hollow container 40 of FIG. 9 and FIG. 10 is in a state where the deformation due to the reduced pressure has not occurred.

The bottom part 43 of the hollow container 40 shown in FIG. 9 and FIG. 10 includes the upper bottom part 44 and the foot part (heel part) 45, and the upper bottom part 44 functions as the reduced-pressure absorption panel part. Also, the upper bottom part 44 includes an inclined part 44a, an intermediate wall part 44b, and a concave-shaped part 44c. The inclined part 44a is provided to be inclined to the outside (lower side) of the hollow container 40 and continuously from a vertical wall part 45a of the foot part 45. The intermediate wall part 44b is substantially parallel to the ground surface, and is provided to connect an inner side of the inclined part 44a and an outer side of the concave-shaped part 44c. The concave-shaped part 44c is provided continuously inside the intermediate wall part 44b, and is formed in a concave shape on the inside (upper side) of the hollow container 40.

A plurality of ribs 46 protruding to the outside (lower side) of the hollow container 40 are formed on the inclined part 44a on an outer peripheral pail of the upper bottom part 44. The plurality of ribs 46 are formed intermittently in the circumferential direction of the hollow container 40, and are disposed in at least two rows in the radial direction of the hollow container 40. Each rib 46 is formed in a substantially elongated round shape in plain view. A length of the rib 46 is longer as the rib 46 is disposed radially outside the hollow container 40. A cross section of the rib 46 has an arc shape protruding in a curved manner with respect to the outside (lower side) of the hollow container 40. Of course, the shape of each rib 46 is not particularly limited.

Therefore, the bottom part 43 of the hollow container 40 is provided with the upper bottom part 44 functioning as the reduced-pressure absorption panel part, and a plurality of ribs 46 are provided on the inclined part 44a of the upper bottom part 44, so that deterioration of an aesthetic appearance of the upper bottom part 44 can be prevented.

Here, it is generally difficult to adjust the thickness of each part of the hollow container with high accuracy. For example, it is difficult to make the thickness of the upper bottom part uniform. Therefore, in a related hollow container where no rib is provided on the inclined part of the upper bottom part, when the upper bottom part is deformed due to the internal pressure reduction, the upper bottom part can be provided with a streak formed at a boundary between a easily deformable part and a hardly deformable part, and the entire upper bottom part can be uneven. Accordingly, the aesthetic appearance of the hollow container is significantly deteriorated, and the commercial value may be reduced.

However, when a plurality of ribs 46 are provided on the inclined part 44a of the hollow container 40 as described above, the generation of the above streaks can be prevented. Even when the streak occurs, the streak is formed between the plurality of ribs 46 and is thus hardly visible. Also, with a decorative effect of the ribs 46, it is also difficult to identify the uneven state of the entire upper bottom part 44 functioning as the reduced-pressure absorption panel part.

Therefore, it is possible to prevent a decrease in the aesthetic appearance of the surface of the upper bottom part 44 after the reduced-pressure absorption, that is, a decrease in the commercial value of the hollow container 40, and accordingly, it is possible to prevent a decrease in the consumer's willingness to purchase.

In the above embodiments, a mode in which the thinning step is performed during the primary blowing has been described. However, the thinning step may be performed during the final blowing (secondary blowing). When the thinning step is performed during the final blowing, the heat-treated and high-temperature intermediate molded product is subjected to the thinning step. This also makes it possible to achieve the thinning of the bottom part and to improve the degree of uneven thickness of each part. The thinning step may be performed both during the primary blowing and the final blowing.

Further, in the above embodiments, an example in which the resin material constituting the preform 10 is PET, and the hollow container as the final molded product is a so-called PET bottle has been described. However, the resin material is not limited to PET. It is possible to adjust the temperature, time, and the like of the thinning step according to the selected resin material (for example, polypropylene (PP) or polyethylene (PE)).

In the above embodiments, the thinning step including the first blowing step, the first exhausting step, the second blowing step, and the second exhausting step has been described. However, the thinning step may include further blowing step and exhausting step thereafter. The blowing step after the second exhausting step (for example, a third blowing step (fifth step), a fourth blowing step (seventh step) . . . ) may be performed in the same manner as the first blowing step and the second blowing step, and the exhausting step after the second exhausting step (for example, a third exhausting step (sixth step), a fourth exhausting step (eighth step) . . . ) may be performed in the same manner as the first exhausting step and the second exhausting step.

The devices of the first embodiment and the second embodiment may be of a linear transport type that sequentially transports an intermediate molded product and a hollow container on a straight line, instead of the intermittent rotation transport type.

Above, according to the present invention, it is possible to provide a blow molding method and a blow molding device capable of improving the degree of uneven thickness of each part of the hollow container.

INDUSTRIAL APPLICABILITY

The present invention can be utilized in the industrial field regarding a blow molding method and a blow molding device.

REFERENCE SIGNS LIST 10 preform
12 mouth part
20 primary molded product
22 mouth part
23 bottom part
24 upper bottom part
25 foot part (heel part)
30 intermediate molded product
33 bottom part
34 upper bottom part
35 foot part (heel part)
40 hollow container
41 body part
42 concave part
43 bottom part
44 upper bottom part
44a inclined part
44b intermediate wall part
44c concave-shaped part
45 foot part (heel part)
46 rib
100 blow molding device
100A blow molding device
100B blow molding device
110 injection device
120 injection molding unit
121 injection molding mold
122 injection cavity mold
123 core mold
124 neck mold
125 gate
130 temperature adjustment unit
131 temperature adjustment pot
140 blow molding unit (intermediate molding unit)
141 blow molding mold
142 blow molding split mold
143 stretching rod
144 blow bottom mold
145 blow core
150 final molding unit
151 final blow molding mold
152 final blow molding split mold
153 final blow bottom mold
154 convex part
160 removing unit
170 blow molding unit
171 blow molding mold
172 blow molding split mold
173 stretching rod
174 blow bottom mold
175 convex part
176 blow core

The invention claimed is:

1. A blow molding method comprising:
performing a primary blowing on a resin preform to form an intermediate molded product; and
performing a final blowing on the intermediate molded product to form a final molded product,
wherein at least one step of performing the primary blowing and the final blowing includes a thinning step of continuously repeatedly performing, within a predetermined time, steps of:
stretching an object by blowing; and
contracting stretched parts of the object by exhausting blown air,
wherein the thinning step includes at least:
a first step of stretching parts of the object by blowing;
a second step of exhausting gas introduced into the object in the first step and contracting each stretched part of the object;
a third step of stretching each part of the object by blowing after the second step; and
a fourth step of exhausting gas introduced into the object in the third step and contracting each stretched part of the object, and
wherein the second step is performed in a time shorter than that of the fourth step.

2. The blow molding method according to claim 1,
wherein each of the first step, the second step, the third step, and the fourth step is performed for equal to or shorter than two seconds.

3. The blow molding method according to claim 1,
wherein, in the step of performing the primary blowing, the intermediate molded product is formed using heat remaining in the preform after injection molding.

4. The blow molding method according to claim 1,
wherein the primary blowing is a heat set blowing, and the primary blowing promotes crystallization of a resin forming the intermediate molded product.

5. The blow molding method according to claim 1,
wherein the step of performing the primary blowing includes the thinning step, and
wherein, in the first step, each part is stretched while a bottom part of the preform as the object is pressed with a stretching rod.

6. The blow molding method according to claim 5,
wherein, in the thinning step, a state where the stretching rod abuts against the bottom part of the object is maintained after the blowing in the first step.

\* \* \* \* \*